United States Patent [19]

Maeda

[11] 4,355,894
[45] Oct. 26, 1982

[54] METHOD AND APPARATUS FOR CORRECTING FOR METEOROLOGICAL ERROR IN DISTANCE MEASUREMENTS USING LIGHT WAVES

[75] Inventor: Masaru Maeda, Kawasaki, Japan

[73] Assignee: Nippon Kogaku K. K., Tokyo, Japan

[21] Appl. No.: 169,377

[22] Filed: Jul. 16, 1980

[30] Foreign Application Priority Data

Jul. 26, 1979 [JP] Japan .................................. 54-94243

[51] Int. Cl.³ .............................................. G01C 3/08
[52] U.S. Cl. ......................................... 356/5; 356/4; 455/605; 455/617
[58] Field of Search ..................... 455/605, 617; 356/5, 356/4

[56] References Cited

U.S. PATENT DOCUMENTS

| | | | |
|---|---|---|---|
| 3,680,958 | 8/1972 | Von Bose | 356/4 |
| 3,787,118 | 1/1974 | Nowicki et al. | 356/5 |
| 3,790,277 | 2/1974 | Hogan | 356/4 |
| 3,832,056 | 8/1974 | Shipp et al. | 356/5 |
| 3,846,026 | 11/1974 | Waters | 356/4 |
| 4,077,718 | 3/1978 | Graham, Jr. et al. | 356/5 |

Primary Examiner—S. C. Buczinski
Attorney, Agent, or Firm—Shapiro and Shapiro

[57] ABSTRACT

In a light wave distance measuring method and apparatus for measuring the distance between spaced locations and for providing an output indicating the distance measurement, the prevailing meteorological conditions at each of the spaced locations are automatically measured simultaneously with the measurement of the distance between the locations and the distance measurement is automatically corrected to eliminate error due to variations in the meteorological conditions from predetermined meteorological conditions.

23 Claims, 4 Drawing Figures

METHOD AND APPARATUS FOR CORRECTING FOR METEOROLOGICAL ERROR IN DISTANCE MEASUREMENTS USING LIGHT WAVES

BACKGROUND OF THE INVENTION

1. Field of the Invention

The present invention relates generally to methods and apparatus for measuring distance using light waves, and more particularly to a method and an apparatus for correcting for meteorological error in the distance measurement.

2. Description of the Prior Art

When the distance between spaced locations is measured by measuring the propagation time of a light beam between the locations, the measurement is influenced by the prevailing meteorological conditions. Since the refractive index of air varies with variations in meteorological conditions, such as temperature, atmospheric pressure, humidity, etc., the propagating speed of light in air also varies in accordance with the variations in meteorological conditions. Specifically, the speed of light changes at the rate of about 0.84 ppm/°C. with temperature, about 0.33 ppm/mm Hg with atmospheric pressure, and about 0.05 ppm/mm Hg with water vapor pressure, i.e., humidity. Accordingly when employing light waves to measure distance, these meteorological conditions should be taken into consideration and the distance value obtained by the measurement should be appropriately corrected in accordance with the meteorological conditions prevailing at the time of the measurement.

Prior art methods and apparatus for correcting distance measurements for meteorological conditions have several disadvantages. Typically, prior to making a distance measurement, an operator was required to measure temperature, atmospheric pressure, humidity, etc. in order to obtain an appropriate correction value which was then manually input into an appropriate circuit in the distance measuring apparatus. The apparatus would then apply the correction value to the measured distance value in order to produce a corrected distance value. This technique is inconvenient and is subject to error in that it assumes uniformity in the meteorological conditions along the path of the light beam.

As may be appreciated, as the length of the path which it is desired to measure increases, the possibility of non-uniformity in meteorological conditions also increases; and, therefore, the possibility of error in the measurement increases. Although the meteorological conditions may be measured at many points distributed along the path of the light wave and these measurements used to determine an appropriate correction value, this approach is too burdensome to be practical. Therefore, in prior art methods and apparatus, meteorological conditions have usually been measured only at the two ends of the path to be measured, i.e., at the site of the distance measuring unit (light transmitting and receiving unit) of the apparatus and at the site of the reflection unit of the apparatus. This requires an operator at the site of the reflection unit to measure the prevailing meteorological conditions at that site and to transmit them via a radio channel or the like to an operator at the distance measuring unit. The operator at the distance measuring unit can then average the measurements of the meteorological conditions and find a mean correction value for introduction into the apparatus. This is also very burdensome and time consuming, and is subject to error in that it assumes that the meteorological conditions have not changed between the time they were measured and the time the distance measurement is performed.

SUMMARY OF THE INVENTION

Accordingly, it is an object of the invention to provide a new and improved light wave distance measuring method and apparatus which overcome the disadvantages of the prior art, and in which measured distance values are corrected for meteorological error quickly, easily, and accurately.

Briefly stated, in one aspect, a light wave distance measuring apparatus in accordance with the invention for measuring the distance between spaced locations and for providing an output indicating the result of the measurement comprises means for automatically measuring the prevailing meteorological conditions at each of the spaced locations simultaneously with the measurement of said distance, and means responsive to the measuring means for automatically correcting the distance measurement to eliminate error due to variations in the meteorological conditions from predetermined meteorological conditions.

In accordance with another aspect of the invention, a method is provided for measuring the distance between spaced locations using light waves and for providing an output indicating the result of the measurement that comprises automatically measuring the prevailing meteorological conditions at each of the spaced locations simultaneously with the measurement of said distance, and automatically correcting the distance measurement to eliminate error due to variations in the meteorological conditions from predetermined meteorological conditions.

Other objects, features, and advantages of the invention will become more fully apparent from the following description taken in conjunction with the accompanying drawings.

DESCRIPTION OF THE PREFERRED EMBODIMENTS

Figure 1:
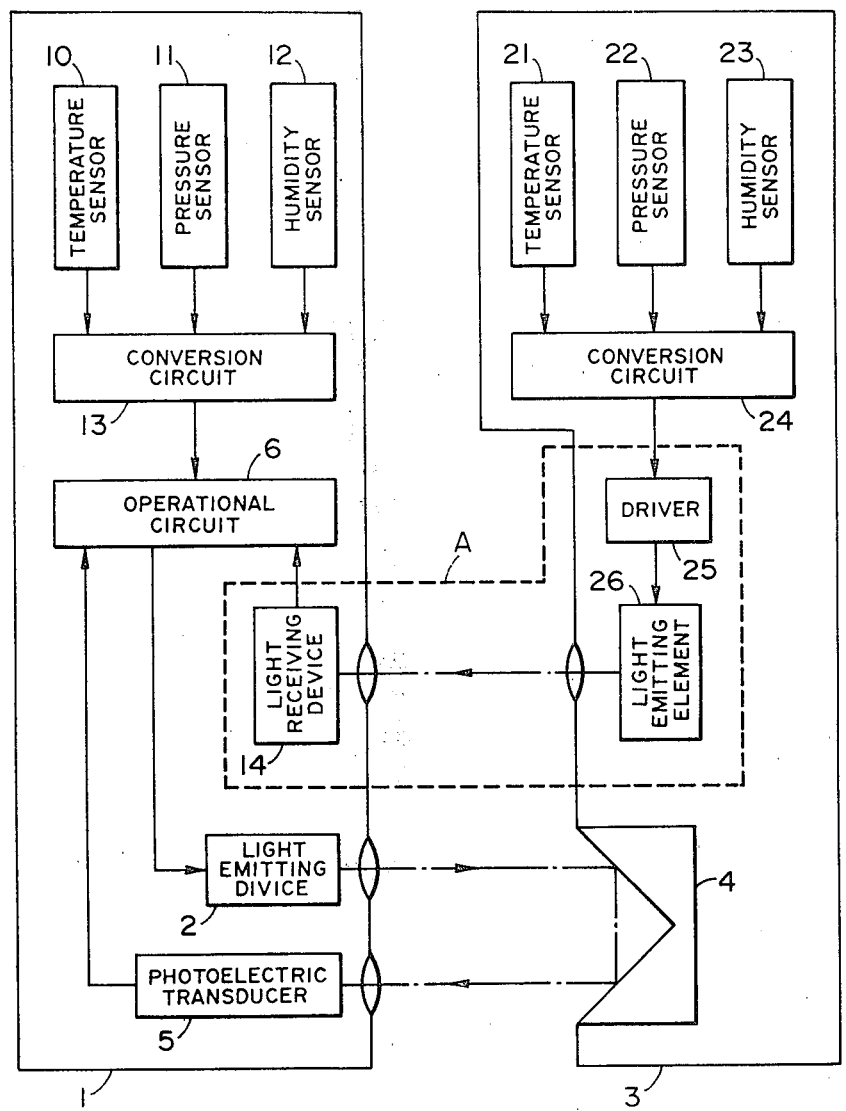
FIG. 1 is a block diagram of a light wave distance measuring apparatus in accordance with a first embodiment of the invention.

Referring to FIG. 1, a light wave distance measuring apparatus in accordance with a first embodiment of the invention is illustrated. The apparatus comprises a distance measuring unit 1 and a reflection unit 3. The distance measuring unit includes a light emitting device 2 for emitting a modulated light wave which is directed to a corner cube or reflector 4 located in the reflection unit 3. The corner cube 4 reflects the light received from the light emitting device back to a photoelectric transducer 5 in the distance measuring unit. An output signal from the photoelectric transducer 5 is introduced into an operational circuit 6 which measures the round trip propagation time of the light wave between the distance measuring unit and the reflection unit, and converts this measurement into a distance value. The arrangement of elements so far described may be conventional.

In accordance with the invention, the distance measuring unit further comprises a temperature sensor 10, an atmospheric pressure sensor 11 and a humidity sensor 12, which together constitute a first sensor means for detecting and measuring the prevailing meteorological conditions at the site of the distance measuring unit. Sensors 10, 11, and 12 transduce the measured temperature, atmospheric pressure and humidity into corresponding electrical signals which are input into a conversion circuit 13. As will be described, from these input signals conversion circuit 13 produces a correction value for correcting the error in the measured distance value resulting from variations in the meteorological conditions at the site of the distance measuring unit from a predetermined set of reference conditions. The correction value produced by the conversion circuit is introduced into the oerational circuit 6. The operational circuit may utilize this correction value and another correction value from the reflection unit, as will be explained, to generate a correction signal which is applied to the measured distance value to correct for meteorological error.

Reflection unit 3 also comprises a temperature sensor 21, an atmospheric pressure sensor 22 and a humidity sensor 23, which may be similar to corresponding sensors in the distance measuring unit, and which together constitute second sensor means. The output signals of sensors 21-23, which correspond to the measured values of temperature, atmospheric pressure and humidity, respectively, prevailing at the site of the reflection unit, are input into a second conversion circuit 24, which may be similar to conversion circuit 13. Conversion circuit 24 converts the input signals into a second correction value for correcting the error in the measured distance value resulting from variations in the prevailing meteorological conditions at the site of the reflection unit 3 from the predetermined set of reference conditions. The correction value from conversion circuit 24 may be input into a driver 25, which pulse modulates a light wave emitted from a light emitting element 26. The beam of light from light emitting element 26 is received by a light receiving device 14 in the distance measuring unit 1 where it is demodulated, and the correction value is introduced into the operational circuit 6. As will be described, operational circuit 6 combines the correction value from light receiving device 14 with the correction value from conversion circuit 13 (as by averaging the two values) to produce a correction signal which is applied to the measured distance value to correct for meteorological error. Driver 25, light emitting element 26 and light receiving device 14 may all be conventional elements, and together they constitute a light transmission unit A. Of course, light transmission unit A may be replaced with another type of signal transmission system, such as one employing radio waves.

With the arrangement of the apparatus described above and illustrated in FIG. 1, the meteorological conditions prevailing at the distance measuring unit site and the receiving unit site may be measured automatically and simultaneously with the measurement of the distance between the sites, and the measurements of the prevailing meteorological conditions may be used to produce a correction signal which is automatically applied to the distance measurement to correct for meteorological error. The correction signal is preferably obtained by averaging the first and second correction values produced by conversion circuits 13 and 24, respectively, to produce an average correctin value which may be utilized as the correction signal. This automatically takes into account the prevailing meteorological conditions at the two sites. The correction values may be obtained in the following manner.

As is well known to those skilled in the art, the ratio of the change in refractive index $\Delta n$ of air, resulting from variations in meteorological conditions from certain reference meteorological conditions, to the refractive index n in air at the reference meteorological conditions, i.e., the ratio $\Delta n/n$ is given by:

$$\frac{\Delta n}{n} = A \cdot \Delta T + B \cdot \Delta P + C \cdot \Delta N \qquad (1)$$

where $\Delta T$ is the variation in temperature from the reference temperature, $\Delta P$ is the variation in atmospheric pressure from the reference atmospheric pressure, $\Delta N$ is the variation in water vapor pressure (humidity) from the reference water vapor pressure, and A, B, and C are constants.

If the terms $\Delta T$, $\Delta P$, and $\Delta N$ respesents variations in the meteorological conditions at a particular site, e.g., the distance measuring unit site, from corresponding reference conditions, the ratio $\Delta n/n$ corresponds to the correction value generated by the conversion circuit, e.g., conversion circuit 13, at that site. The correction signal may be then found by averaging the separate ratios given by Equation (1) for each of the two sites. On the other hand, if the terms $\Delta T$, $\Delta P$, and $\Delta N$ represent variations in the average meteorological conditions between the two sites from the corresponding reference conditions, Equation (1) gives the correction signal directly. Assuming the latter to be the case, a true distance value D (one free of meteorological error) may be obtained by applying a correction of the form $(1 + \Delta n/n)$ to the measured distance value X, i.e., $$D = X\left(1 + \frac{\Delta n}{n}\right) . \qquad (2)$$

Figure 2:
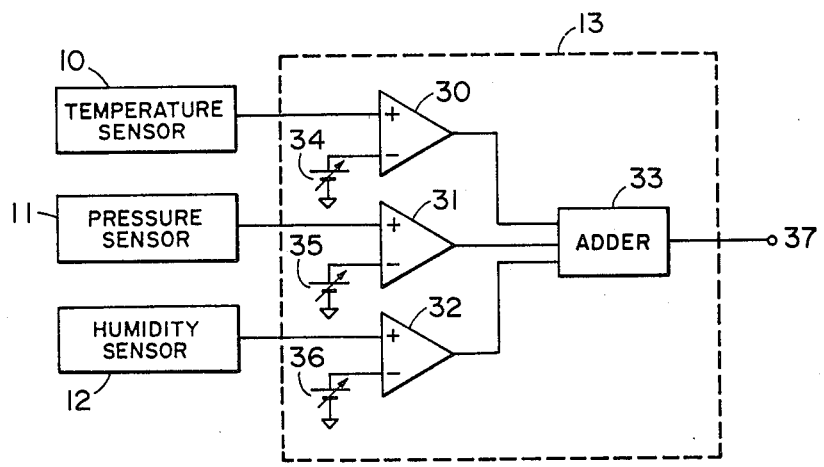
FIG. 2 is a schematic diagram of a conversion circuit which may be employed in the apparatus of FIG. 1.

FIG. 2 is a schematic diagram of conversion circuit 13 (conversion circuit 24 preferably being similar) which may be employed to generate an output signal corresponding to the ratio $\Delta n/n$. As shown, the outputs of temperature sensor 10, pressure sensor 11, and humidity sensor 12 are introduced into the non-inverting input of amplifiers 30, 31 and 32, respectively. The outputs of the amplifiers are input into an adder 33 which sums the amplifier outputs and provides the sum on terminal 37, which terminal corresponds to the input of operational circuit 6. Connected to the inverting input of amplifiers 30, 31 and 32 are reference voltages 34, 35 and 36, respectively. Reference voltages 34, 35 and 36 may be adjusted to correspond to the output voltages of sensors 10, 11 and 12, respectively, at the reference temperature, reference atmospheric pressure and reference humidity, respectively. The output voltage from each amplifier is equal to the difference between the input voltage from its corresponding sensor and its corresponding reference voltage, multiplied by the gain of the amplifier. By selecting the gains of amplifiers 30, 31 and 32 to be A, B, and C, respectively, the output of amplifier 30 will be equal to $A \cdot \Delta T$, the output of amplifier 31 will be equal to $B \cdot \Delta P$, and the output of amplifier 32 will be equal to $C \cdot \Delta N$. Accordingly, the output of adder 33 will be the ratio $\Delta n/n$ which is given by Equation (1). Since the input voltages to the amplifiers represent measurements of the prevailing meteorological conditions at the site of the distance measuring unit, the output of adder 33 corresponds to the first correction value. Conversion circuit 24 may similarly derive the second correction value (for the reflection unit site) from sensors 21–23, and the two correction values may be input into operational circuit 6, as previously described.

Figure 3:
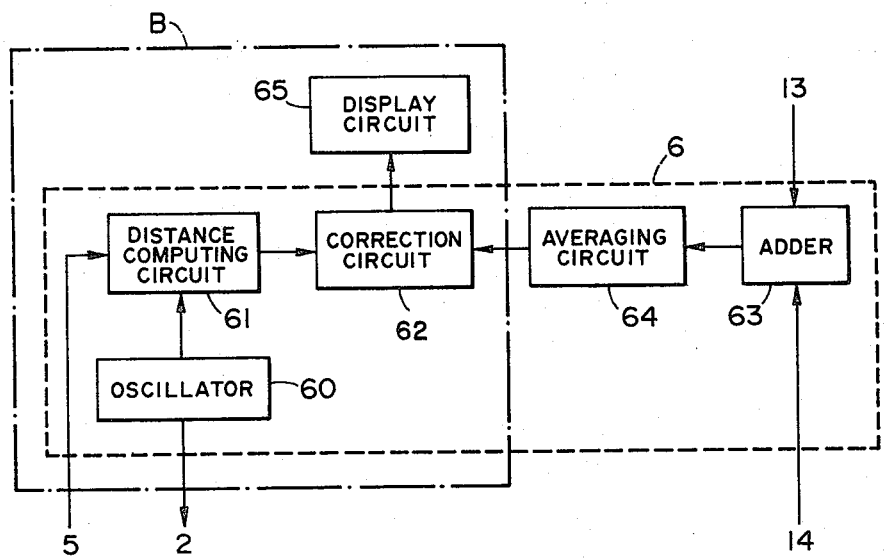
FIG. 3 is a block diagram of an operational circuit which may be employed in the apparatus of FIG. 1.

An example of the operational circuit 6 is illustrated in FIG. 3. In FIG. 3, reference numeral 60 designates an oscillator, one output of which is connected to the light emitting device 2 as a modulating signal and another output of which is introduced into a distance computing circuit 61 as a demodulating signal. Distance computing circuit 61 also receives the output from the photoelectric transducer 5 corresponding to the light wave reflected from the corner cube 4 in the reflection unit 3. The distance computing circuit utilizes the oscillator signal and the signal from the photoelectric transducer to compute the distance between the distance measuring unit and the reflection unit by measuring the round trip propagation time of the light wave in a well-known manner. The output of distance computing circuit 61, which is the measured distance value, is input into a correction circuit 62 which applies a correction signal to the measured distance value to correct for error due to variations in meteorological conditions from reference conditions. The corrected value is indicated by means of a display circuit 65. The various elements enclosed within block B in FIG. 3 may be conventional elements used in light wave distance measuring apparatus and may be employed without modification. The correction signal may be generated in the following manner.

Referring to FIG. 3, the first correction value from conversion circuit 13, corresponding to variations in the prevailing meteorological conditions at the distance measuring unit, and the second correction value from light receiving device 14, corresponding to variations in the prevailing meteorological conditions at the reflection unit, may be introduced into an adder 63 which sums the correction values. The output of adder 63 may be introduced into an averaging circuit 64 to average the correction values to form a correction signal which is introduced into the correction circuit 62. Using the correction signal and the measured distance value, correction circuit 62 computes the true distance, free of the influence of meteorological conditions, by performing the operation indicated in Equation (2). Correction circuit 62 may be a variable gain amplifier, for example, the gain of which is controlled by the correction signal in the manner indicated in Equation (2). The true distance value output from the correction circuit may be provided to the display circuit 65 to indicate the true distance.

In the first embodiment of the invention described above, the reflection unit 3 includes a conversion circuit 24 for obtaining a correction value representative of the variations in the meterological conditions at the reflection unit, which signal is transmitted to the distance measuring unit where it is combined with the correction value (from conversion circuit 13) representative of the variations in the meteorological conditions at the distance measuring unit as described above. However, in a second embodiment of the invention, conversion circuit 24 may be omitted and its function may be performed by conversion circuit 13 in the distance measuring unit, as will now be described.

Figure 4:
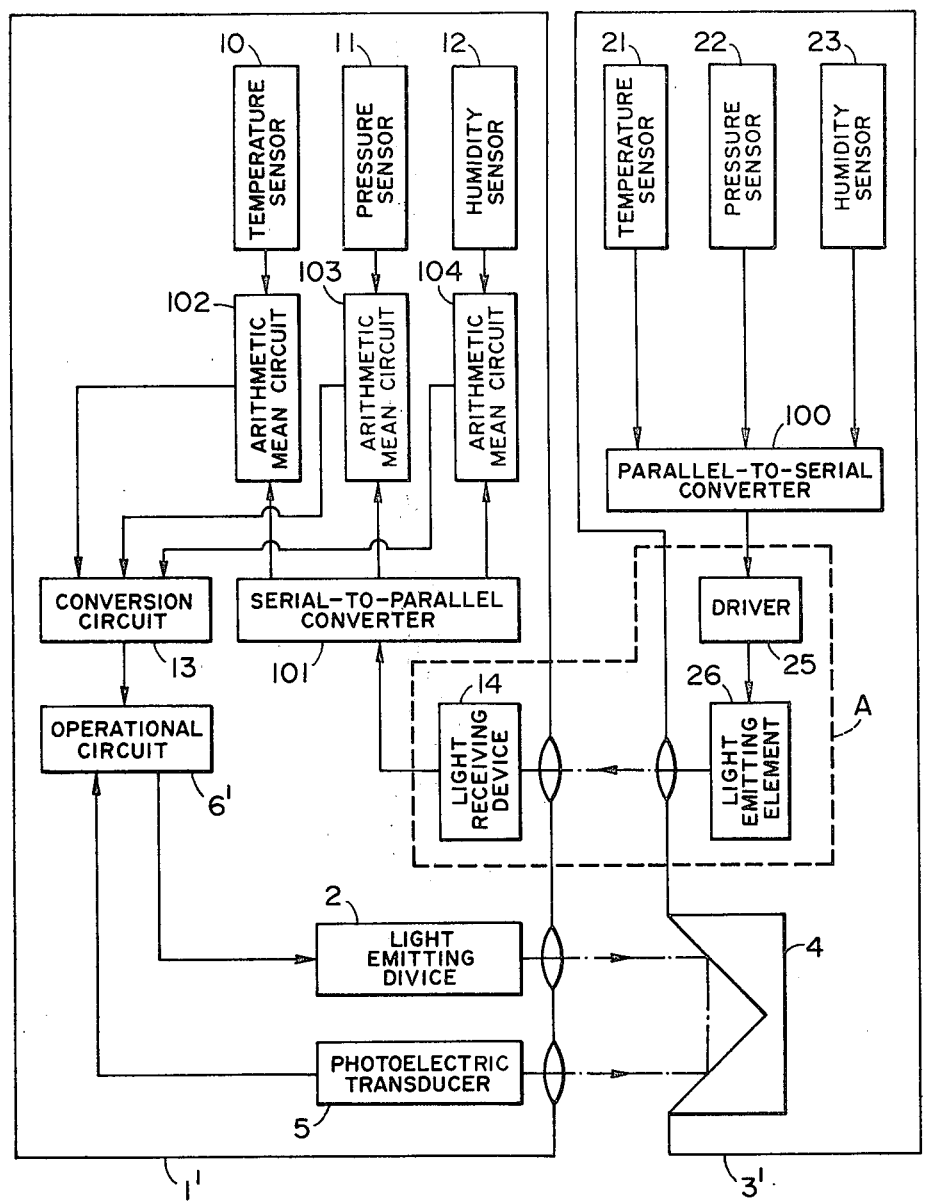
FIG. 4 is a block diagram of a light wave distance measuring apparatus in accordance with a second embodiment of the invention.

FIG. 4 illustrates a second embodiment of the invention, which, in many respects, is similar to the apparatus of the first embodiment. Accordingly, only the differences between the two embodiments will be described.

As shown in FIG. 4, instead of a conversion circuit 24, reflection unit 3' may include a parallel-to-serial converter circuit 100 to convert the parallel data from the temperature sensor 21, pressure sensor 22 and humidity sensor 23 into serial data which is input into driver 25 and used to modulate light emitting device 26. Thus, the signals from sensors 21–23 are sequentially transmitted to the light receiving device 14 in the distance measuring unit 1', the signals being representative of the actual measured values of temperature, atmospheric pressure and humidity at the site of the reflection unit.

In the distance measuring unit 1', light receiving device 14 demodulates the light wave from light emitting device 26 and introduces the serial data into a serial-to-parallel converter circuit 101, which converts the serial data back into parallel data, and introduces the parallel data into arithmetic mean (averaging) circuits 102, 103, and 104. Arithmetic mean circuit 102 takes the arithmetic mean of the temperature at the site of the distance measuring unit 1', as measured by temperature sensor 10, and the temperature at the site of the reflection unit 3' which is output from the serial-to-parallel converter circuit 101, and outputs a signal representative of the mean value of the temperature, which is introduced into conversion circuit 13 where it may be compared with a reference voltage in the manner previously described. Arithmetic mean circuits 103 and 104 similarly output signals representative of the mean values of the atmospheric pressure and humidity, respectively, between the two sites and input these signals into conversion circuit 13. Conversion circuit 13 operates in the same manner as previously described to provide a correction signal, which may be introduced into operational circuit 6' (corresponding to the elements illustrated in block B of FIG. 3) which corrects the measured distance value for meteorological error, as previously described.

As may be readily appreciated from the foregoing, the present invention automatically measures the prevailing meteorological conditions at spaced locations simultaneously with the measurement of the distance between the locations, and automatically applies a correction value to the measured distance value to eliminate error due to variations in the meteorological conditions from predetermined meteorological conditions. The measured distance value may be corrected prior to indicating the result of the distance measurement. Since the meteorological conditions are measured at the time the distance measurement is made, error resulting from changes in meteorological conditions between the time they are measured and the time that the distance is measured is eliminated. Furthermore, since the meteorological conditions at both sites are automatically measured and the measurements are utilized to generate the correction signal, the invention insures accurate distance measurements and eliminates the inconvenience of prior art devices.

While preferred embodiments of the invention have been shown and described, it will be apparent to those skilled in the art that changes can be made in these embodiments without departing from the principles and spirit of the invention, the scope of which is defined in the appended claims.

I claim:

1. In light wave distance measuring apparatus for measuring the distance between spaced locations and for providing an output indicating the result of the measurement, the improvement comprising:
   means for automatically measuring the prevailing meteorological conditions at each of said spaced locations simultaneously with the measurement of said distance; and
   means responsive to the measuring means for automatically correcting the distance measurement to eliminate error due to variations in said meteorological conditions from predetermined meteorological conditions.

2. The apparatus of claim 1, wherein the measuring means comprises first sensor means for measuring the meteorological conditions at a first one of said locations and for producing first signals representative of the meteorological conditions at the first location, and second sensor means for measuring the meteorological conditions at a second one of said locations and for producing second signals representative of the meteorological conditions at the second location.

3. The apparatus of claim 2, wherein the meteorological conditions include temperature, atmospheric pressure, and humidity, and wherein said first and second sensor means each comprises a temperature sensor, an atmospheric pressure sensor, and a humidity sensor.

4. The apparatus of claim 2, wherein the correcting means comprises means for converting the first and second signals into a correction signal representative of the variations in the meteorological conditions at the first and second locations from the predetermined meteorological conditions.

5. The apparatus of claim 4, wherein the correcting means comprises means for applying the correction signal to said distance measurement prior to indicating the result of the distance measurement.

6. The apparatus of claim 4, wherein the converting means comprises means for comparing the first and second signals with reference signals representative of said predetermined meteorological conditions to generate difference signals corresponding to the differences between the meteorological conditions at the first and second locations and the predetermined meteorological conditions, said difference signals being used to produce said correction signal.

7. The apparatus of claim 6, wherein the converting means comprises first and second conversion circuits for individually comparing said first and second signals with said reference signals and for producing first and second correction values from said difference signals, and wherein the correcting means further comprises means for averaging said first and second correction values to produce said correction signal.

8. The apparatus of claim 7, wherein the averaging means comprises an adder circuit for summing the first and second correction values and an averaging circuit for averaging said sum.

9. The apparatus of claim 7, wherein the first and second conversion circuits are located at said first and second locations, respectively, and said averaging means is located at the first location.

10. The apparatus of claim 9, further comprising means for transmitting the second correction value to the first location.

11. The apparatus of claim 10, wherein said transmitting means comprises a light emitting device at said second location and a light receiving device at said first location, and means for modulating a beam of light emitted by said light emitting device with said second correction value.

12. The apparatus of claim 6, wherein the correcting means comprises means for averaging the first and second signals to produce average signals corresponding to the average values of the meteorological conditions measured at the first and second locations, and wherein the comparing means compares the average signals with the reference signals to produce said correction signal.

13. The apparatus of claim 12 further comprising means for transmitting the second signals to the first location.

14. The apparatus of claim 13, wherein the transmitting means comprises a light emitting device at the second location, a light receiving device at the first location and means for modulating a beam of light emitted by the light emitting device with the second signals.

15. The apparatus of claim 14 further comprising parallel-to-serial converter means for converting the second signals to a serial data signal, which serial data signal is input to said modulating means for modulating said light beam, and parallel-to-serial converter means for converting the serial data signal received by the light receiving device into parallel signals corresponding to said second signals.

16. In a method of measuring the distance between spaced locations using light waves and of providing an output indicating the result of the measurement, the improvement comprising:
   automatically measuring the prevailing meteorological conditions at each of the spaced locations simultaneously with the measurement of said distance; and
   automatically correcting the distance measurement to eliminate error due to variations in said meteorological conditions from predetermined meteorological conditions.

17. The method of claim 16, wherein said measuring comprises generating first and second signals corresponding to the measured values of the meteorological conditions at a first one of said locations and at a second one of said locations, respectively.

18. The method of claim 17, wherein the meteorological conditions include temperature, atmospheric pressure and humidity.

19. The method of claim 17, wherein said correcting comprises comparing the first and second signals with reference signals representative of the predetermined meteorological conditions, and producing a correction signal for said distance measurement from said comparing.

20. The method of claim 19, wherein said producing comprises generating first and second correction values representative of the variations in said meteorological conditions at the first and second locations, respectively, from said reference conditions, and averaging said first and second correction values to produce said correction signal.

21. The method of claim 20 further comprising transmitting the second correction value to the first location and performing said averaging at the first location.

22. The method of claim 19, wherein said producing comprises averaging the first and second signals to produce average signals corresponding to the average values of the meteorological conditions measured at the first and second locations, and comparing the average signals with said reference signals to produce the correction signal.

23. The method of claim 22 further comprising transmitting the second signals to the first location, and wherein said averaging is performed at the first location.

* * * * *